(12) United States Patent
Abeyasekera et al.

(10) Patent No.: US 11,401,916 B2
(45) Date of Patent: Aug. 2, 2022

(54) METHOD OF CONTROLLING A WIND TURBINE GENERATOR

(71) Applicant: Vestas Offshore Wind A/S, Aarhus N. (DK)

(72) Inventors: Tusitha Abeyasekera, Aarhus N (DK); Sascha Dominic Erbslöh, Aarhus N. (DK); Alex Pericleous, Aarhus N. (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/465,037

(22) Filed: Sep. 2, 2021

(65) Prior Publication Data

US 2022/0082081 A1 Mar. 17, 2022

(30) Foreign Application Priority Data

Sep. 14, 2020 (EP) .................................. 20195931

(51) Int. Cl.
*F03D 9/00* (2016.01)
*H02P 9/04* (2006.01)
(Continued)

(52) U.S. Cl.
CPC ........... *F03D 7/028* (2013.01); *F03D 7/0276* (2013.01); *F03D 9/257* (2017.02); *F05B 2270/101* (2013.01); *F05B 2270/1033* (2013.01); *F05B 2270/3032* (2013.01); *F05B 2270/327* (2013.01); *F05B 2270/342* (2020.08)

(58) Field of Classification Search
CPC .. F03D 7/0276; F03D 7/028; F05B 2270/101; F05B 2270/1033; F05B 2270/3032; F05B 2270/327; F05B 2270/342
See application file for complete search history.

(56) References Cited

U.S. PATENT DOCUMENTS 9,018,782 B2 * 4/2015 Couchman ................ H02P 9/02
290/55
9,644,609 B2 * 5/2017 Turner ..................... F03D 7/043
(Continued)

FOREIGN PATENT DOCUMENTS

WO 2016058617 A1 4/2016

OTHER PUBLICATIONS

European Patent Office, Extended Search Report in EP Application No. 20195931.9, dated Mar. 5, 2021.

*Primary Examiner* — Tulsidas C Patel
*Assistant Examiner* — Thomas K Quigley
(74) *Attorney, Agent, or Firm* — Wood Herron & Evans LLP

(57) ABSTRACT

A method 300 of controlling a wind turbine generator is disclosed. The method comprises operating 302 the wind turbine in accordance with a power curve having a knee region and monitoring 304 a temperature of at least one thermal hotspot of the wind turbine generator. The method further comprises initiating 306 a power boost to temporarily increase an active power generated by the wind turbine generator above a rated power when the wind turbine generator enters the knee region of the power curve and controlling 312 at least one of a magnitude and a duration of the power boost in dependence on the temperature of the at least one thermal hotspot of the wind turbine generator.

13 Claims, 4 Drawing Sheets

(51) Int. Cl.
    *F03D 7/02*     (2006.01)
    *F03D 9/25*     (2016.01)

(56) References Cited

U.S. PATENT DOCUMENTS

| | | | |
|---|---|---|---|
| 10,975,844 B2* | 4/2021 | Spruce | F03D 17/00 |
| 2010/0298991 A1* | 11/2010 | Alonso Sadaba | H02J 3/1892 |
| | | | 700/276 |
| 2013/0257051 A1* | 10/2013 | Spruce | H02P 9/008 |
| | | | 290/44 |
| 2013/0270827 A1* | 10/2013 | Couchman | F03D 7/042 |
| | | | 290/44 |
| 2013/0313827 A1 | 11/2013 | Lovmand et al. | |
| 2014/0203563 A1* | 7/2014 | Bowyer | F03D 7/0284 |
| | | | 290/44 |
| 2014/0248123 A1* | 9/2014 | Turner | F03D 7/042 |
| | | | 415/15 |
| 2015/0008672 A1* | 1/2015 | Garcia | H02J 3/24 |
| | | | 290/44 |
| 2015/0349688 A1* | 12/2015 | Wagoner | H02P 9/007 |
| | | | 290/44 |
| 2017/0356420 A1* | 12/2017 | Hales | F03D 7/0276 |
| 2018/0156197 A1* | 6/2018 | Spruce | F03D 7/0292 |
| 2018/0171979 A1* | 6/2018 | Spruce | F03D 7/0292 |
| 2018/0173215 A1* | 6/2018 | Spruce | F03D 7/047 |
| 2018/0180024 A1* | 6/2018 | Spruce | G05B 15/02 |
| 2018/0180025 A1* | 6/2018 | Spruce | F03D 17/00 |
| 2018/0180026 A1* | 6/2018 | Spruce | F03D 17/00 |
| 2018/0187648 A1* | 7/2018 | Spruce | F03D 7/0292 |
| 2018/0187649 A1* | 7/2018 | Spruce | F03D 9/257 |
| 2018/0187650 A1* | 7/2018 | Byreddy | F03D 7/028 |
| 2018/0223808 A1* | 8/2018 | Spruce | F03D 17/00 |

* cited by examiner

METHOD OF CONTROLLING A WIND TURBINE GENERATOR

FIELD OF THE INVENTION

The present invention relates primarily to a method of controlling a wind turbine generator, and also to a wind turbine generator comprising a controller, and a wind park comprising a wind park controller and a plurality of wind turbine generators.

BACKGROUND

A wind turbine generator is a device which is able to generate electrical power from wind energy. Kinetic energy from the wind is captured by one or more rotating blades and converted into electrical energy via a rotor that is coupled to a generator.

Operation of a wind turbine generator is conventionally controlled in accordance with a power curve, which is a graph that indicates the power generated by the wind turbine generator at different wind speeds. During operation, wind turbine generators are known to spend up to approximately ⅓rd of their operating time within a region of the power curve known as a knee region. The knee region is a term of the art that refers to a section of the power curve wherein the power generated by the wind turbine generator increases from below a rated power up to the rated power.

Modern wind turbine generators are often able to temporarily increase their power output above the rated power, using a mode of operation known as a power boost.

Power boosts are typically initiated when the wind turbine generator has been operating below rated power and the wind speed returns to above the rated speed. During a power boost, the nominal power output of the wind turbine generator may be increased by up to approximately 5%, for example by adjusting the blade pitch in order to increase the rotational speed of the rotor. In order to avoid damaging the rotor or other components of the wind turbine generator, the power boost is limited to a short time period of, e.g., approximately 10 seconds. After the power boost, a recovery period may be initiated wherein the generator and the converter are allowed to cool down to normal operating temperatures.

By increasing the rating of the converter, it is possible to increase or extend the power boost; however, this is cost prohibitive. Therefore, an object of the present invention is to improve the annual energy production of the wind turbine generator, without increasing the bill of materials cost.

SUMMARY OF THE INVENTION

According to a first aspect of the invention, there is provided a method of controlling a wind turbine generator, comprising: operating the wind turbine generator in accordance with a power curve having a knee region; monitoring a temperature of at least one thermal hotspot of the wind turbine generator; initiating a power boost to temporarily increase an active power generated by the wind turbine generator above a rated power when the wind turbine generator enters the knee region of the power curve; and controlling at least one of a magnitude and a duration of the power boost in dependence on the temperature of the at least one thermal hotspot of the wind turbine generator.

In this way, the magnitude and duration of the power boost may be increased beyond their usual pre-set limits without damaging the components of the wind turbine generator, e.g. without exceeding the thermal limits of the converter. In particular, conventional wind turbine generators are known to limit their power boost to approximately 5% of the rated power for a duration of 10 seconds to avoid overheating of the converter and/or other components the wind turbine. As described herein, the use of an adaptive power boost which is controlled in accordance with the temperature of one or more thermal hotspots of the wind turbine generator, typically or preferably the ones which are most prone to overheating, allows the power boost to be safely increased beyond current limits without risking overheating and subsequent component damage. As a result, the annual energy production of the wind turbine may be significantly increased without requiring new power train or power production system hardware components, i.e. without increasing the bill of materials cost.

As previously referred to, wind turbines spend up to approximately ⅓rd of their operating time within a region of the power curve known as a knee region. Thus, maximising the wind turbine yield within the knee region has the potential to significantly impact the annual energy production of the wind turbine.

Preferably, both the magnitude and the duration of the power boost are controlled in dependence on the temperature of the at least one thermal hotspot of the wind turbine.

In some examples, the magnitude of the power boost may be at least 10% of the rated power. In other examples, the magnitude of the power boost may be at least 2%, 3%, 5%, or 7% of the rated power, and preferably at least 10%, 12%, 15%, or 20% of rated power, but typically not more than approximately 25% of the rated power.

In some examples, the duration of the power boost may be at least 100 seconds. In other examples, the duration of the power boost may be at least 10, 20, 30, 50, 60, 75 or 90 seconds, and preferably at least 100, 150 or 200 seconds, but typically not more than 600, 800 or 1000 seconds.

Preferably, at least one of the magnitude and the duration of the power boost is controlled in dependence on a difference between the temperature of the at least one thermal hotspot and a threshold temperature of the at least one thermal hotspot. In this way, the magnitude and/or duration of the power boost is increased as the temperature of the least one thermal hotspot is decreased. For example, on a cool day when the ambient temperature is low, the at least one thermal hotspot may be significantly below the threshold temperature. Under these circumstances, a power boost may performed with a greater magnitude and/or duration than a power boost performed on a hot day with a high ambient temperature. This adaptive control, which takes into account the operating conditions of the wind turbine, is able to maximise the yield of the wind turbine.

Preferably, both the magnitude and the duration of the power boost are controlled in dependence on the difference between the temperature of the at least one thermal hotspot and a threshold temperature of the at least one thermal hotspot.

In some embodiments, if the temperature of the at least one thermal hotspot is determined to be equal to or greater than the threshold temperature, the magnitude and duration of the power boost may be controlled to be zero, i.e. a power boost is not performed.

Preferably, the method further comprises: reducing a reactive power generated by the wind turbine when the wind turbine enters the knee region of the power curve; and controlling at least one of the magnitude and the duration of the power boost in dependence on the reduction in the reactive power generated by the wind turbine. In this way, the magnitude and/or duration of the power boost can be further increased without overheating the system. In particular, the temperature of the wind turbine, and e.g. the one or more thermal hotspots, is influenced by the ambient temperature and the total power generated by the wind turbine, e.g. the total power transported through the converter. The total power is composed of active power and reactive power. Hence, by temporarily reducing the reactive power generated by the wind turbine, the active power generated by the wind turbine may be temporarily increased without increasing the heating effect on the wind turbine, and in particular the converter.

Preferably, both the magnitude and the duration of the power boost are controlled in dependence on the reduction in the reactive power generated by the wind turbine.

Preferably, the method further comprises: receiving an indication of reactive power demand; and reducing the reactive power generated by the wind turbine in dependence on the indication of reactive power demand when the wind turbine enters the knee region of the power curve. In this way, the magnitude and duration of the power boost may be increased whilst ensuring that the total reactive power demand of the wind park is met. For example, if the reactive power demand is low, the wind turbine may be able to significantly decrease the reactive power generated by the wind turbine during the power boost, and thus further increase the magnitude and duration of the power boost without overheating the wind turbine. Conversely, if the reactive power demand is high, the reactive power may not be decreased as significantly (or at all), resulting in a smaller increase in the magnitude and duration of the power boost.

Preferably, the method further comprises: reducing one or more damping functions of the wind turbine when the wind turbine enters the knee region, such that a proportion of the active power generated by the wind turbine that is used for the one or more damping functions is reduced and a proportion of active power generated by the wind turbine that may be exported by the wind turbine is increased. In this way, the magnitude and/or duration of the power boost may be further increased without exceeding the design limits of the converter. In particular, the active power generated by the wind turbine and transported through the converter is predominantly exported to the grid. However, an amount of the active power is also used for damping functions of the wind turbine. By temporarily deprioritising the damping functions, the amount of active power that is exported to the grid may be increased during a power boost, without increasing the amount of active power that is transported through the converter, and therefore not exceeding the design limits of the converter.

Preferably, the method further comprises: monitoring a level of oscillations associated with the one or more damping functions; and reducing the one or more damping functions in dependence on the level of oscillations. In this way, the power boost may be optimised in accordance with the level of oscillations, whilst ensuring that the safety of the wind turbine is not compromised. The lower the level of oscillations, the greater the reduction in the damping functions and thus the greater the increase in the magnitude and duration of the power boost. In some examples, if the level of oscillations is determined to be below a first level of oscillations, the damping functions may be completely disabled. Conversely, if the level of oscillations is determined to be above a second level of oscillations, the damping functions may not be reduced, thereby ensuring safe operation of the wind turbine.

Preferably, the one or more damping functions comprise at least one of: drive train damping; and active tower damping.

Preferably, the one or more thermal hotspots corresponds to one or more components of the wind turbine comprising at least one of: an insulated-gate bipolar transistor, IGBT, chip; a grid choke; a capacitor; and a busbar.

Preferably, the method further comprises: controlling a rotational speed of a rotor of the wind turbine such that a standard deviation of variations in the rotational speed of the rotor is limited. In this way, the torque is limited and thus current overshoots on the machine-side converter are also limited. This provides greater headroom for the active power boost.

According to a second aspect of the invention, there is provided a controller for a wind turbine generator, configured to perform the method of the first aspect.

According to a third aspect of the invention, there is provided a wind turbine generator comprising a controller according to the second aspect.

According to a fourth aspect of the invention, there is provided a wind park comprising a wind park controller and a plurality of wind turbine generators according to the third aspect, wherein the wind park controller is configured to: in response to at least one wind turbine generator of the plurality of wind turbine generators performing a power boost in its knee region, control at least one of the active power and the reactive power generated by at least one wind turbine generator of the plurality of wind turbine generators that is not operating in its knee region. In this way, the increase in active power or decrease in reactive power of the at least one wind turbine generator undergoing a power boost may be compensated by the other wind turbine generators to achieve, for example, a constant wind park output.

Preferably, the wind park controller is configured to control at least one of the active power and the reactive power generated by the at least one wind turbine generator of the plurality of wind turbine generators that is not operating in its knee region in accordance with at least one of an active power demand and a reactive power demand. In this way, it is ensured that the total power output of the wind park meets the demands of the electrical grid.

Preferably, said control of at least one of the active power and the reactive power comprises: increasing the reactive power generated by the at least one wind turbine generator of the plurality of wind turbine generators that is not operating in its knee region. In this way, it is possible to achieve a constant total wind park output of reactive power. For example, upwind wind turbines may begin operating in the knee region earlier than downwind wind turbines. Therefore, the wind park controller may increase the reactive power output of one or more downwind wind turbines to compensate for the upwind wind turbines that are undergoing a power boost with reduced reactive power output.

In this document the wind turbine generator may also be referred to as just a 'wind turbine'. However, with 'wind turbine' there is meant wind turbine generator. However, when only the word 'generator' is used, there is—unless otherwise is evidently understood from the given sentence and paragraph—referred to the specific electric device which transfers rotational energy of a drive shaft of the wind turbine generator into electrical energy, i.e. the generator unit itself.

BRIEF DESCRIPTION OF THE DRAWINGS

Embodiments of the invention are now described, by way of example, with reference to the drawings, in which.

DETAILED DESCRIPTION

Figure 1:
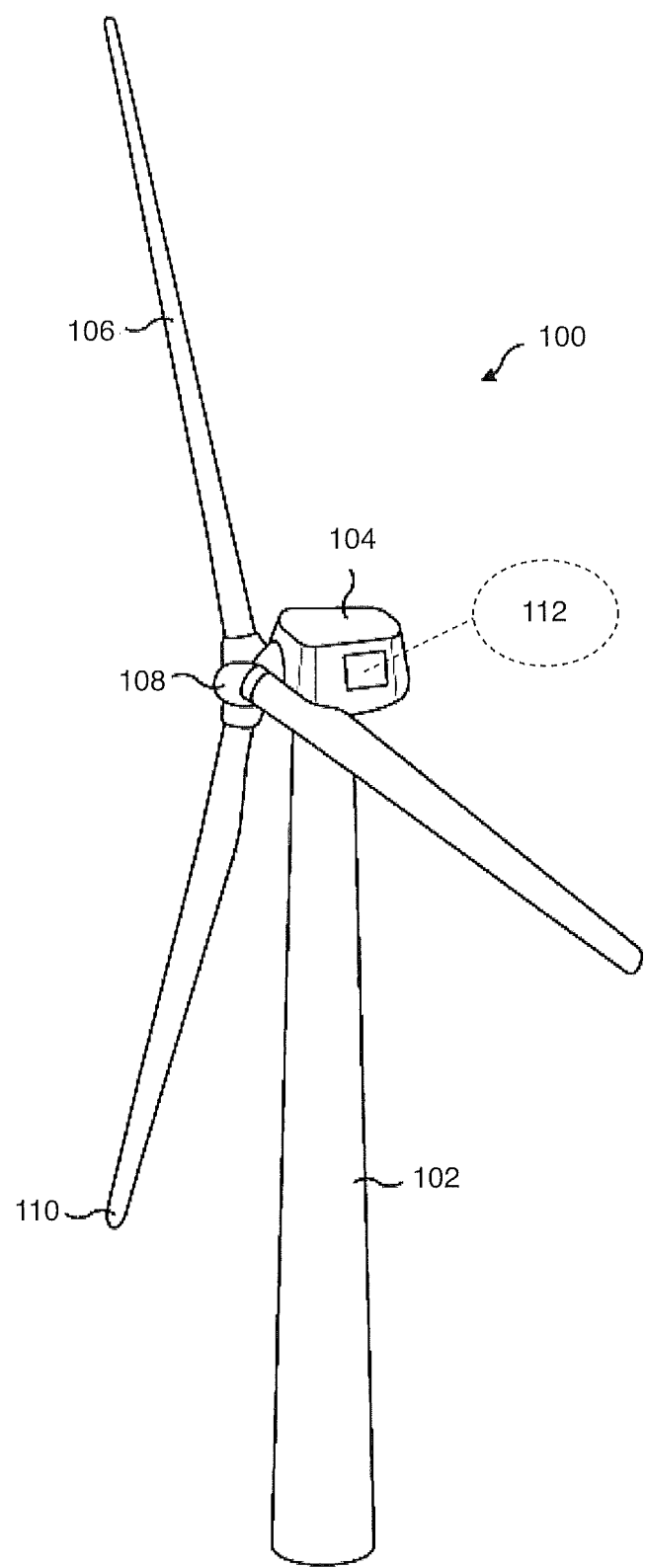
FIG. 1 is a schematic view of a wind turbine generator.

FIG. 1 shows a schematic view of a typical wind turbine generator 100. The wind turbine 100 comprises a tower 102, a nacelle 104 disposed on a longitudinal end of the tower 102, and a rotor 106 coupled to the nacelle 104. The rotor 106 comprises a rotatable hub 108 having a plurality of blades 110 mounted thereto and projecting outwardly from the hub 108. In the illustrated embodiment, the rotor 106 includes three blades 110, but the skilled person will appreciate that the number may vary. The nacelle 104 typically houses a generator and a converter (not shown). A driveshaft (not shown) connects the hub 108 to the generator either directly, or via a gearbox. In use, the rotor 106, and in particular the plurality of blades 110, is driven by the wind which causes the hub 108 to rotate. As a consequence, the driveshaft also rotates and causes the generator to generate electrical energy. The converter converts the generated electrical energy into electrical energy suitable for delivery to a connected electrical grid, i.e. having a frequency which matches that of the connected power grid.

The wind turbine 100 further comprises a controller 112 configured to control operation of the wind turbine 100. The controller may be located inside the nacelle 104 or may be distributed at a number of locations inside (or externally to) the wind turbine 100 and communicatively connected to the wind turbine 100.

Figure 2:
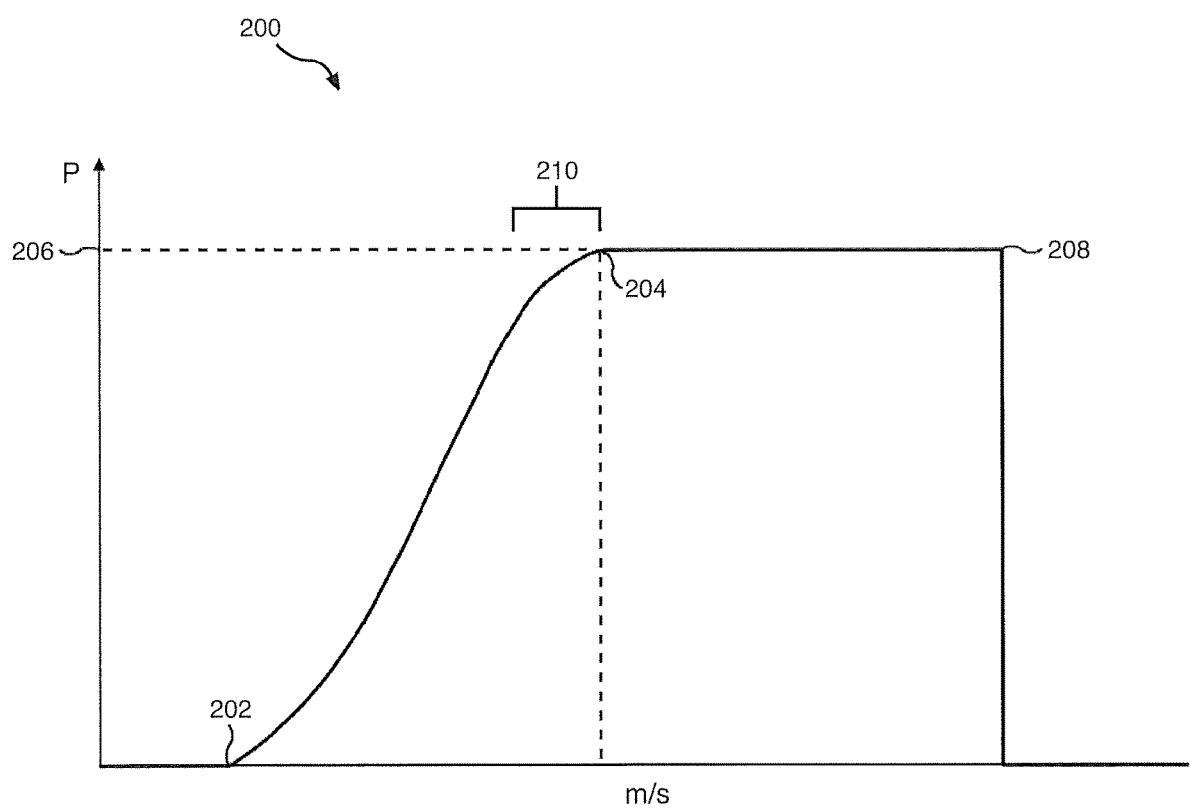
FIG. 2 is a typical power curve for a wind turbine generator.

FIG. 2 shows a typical power curve 200 that may be used by the controller 112 to control operation of the wind turbine 100. The power curve 100 is plotted on a graph of power output, and more specifically active power output, against wind speed. At low wind speeds, there is insufficient torque on the blades 110 to cause the rotor 106 to rotate and the power output of the wind turbine 100 is zero. As the wind speed increases, the rotor 106 begins to rotate and generate electrical power. The wind speed at which the rotor 106 begins to rotate and generate electrical energy is known as the cut-in speed 202. As an example, the cut-in speed 202 may range from 3 to 4 metres per second.

As the wind speed increases further above the cut-in speed 202, the power generated by the wind turbine 100 increases significantly. This is often referred to as the wind turbine 100 operating under partial load. Partial load operation continues until the wind speed reaches a rated wind speed 204. At the rated wind speed 204, the wind turbine 100 begins operating under full load and generates a rated power 206, such as 8 MW or 10 MW. The rated power 206 is the maximum continuous electrical power output that a wind turbine 100 is designed to achieve under normal operating and external conditions. This ensures that the design loads and fatigue life of components is not exceeded. In other words, the rated power 206 is the maximum power output that the wind turbine 100 is able to deliver over a sustained period of time. As an example, the rated wind speed 204 may be between 12 and 17 metres per second.

As the wind speed increases further above the rated wind speed 204, the power generated by the wind turbine 100 remains substantially constant at the rated power 206 until a cut-out speed 208 is reached. A constant power output may be achieved by, for example, altering the pitch angle of the blades 110 so that the blades 110 are pitched out of maximum wind. At the cut-out speed 208, it is considered too unsafe to operate the wind turbine 100. The wind turbine 100 is shut down e.g. by utilising a braking system, thereby reducing the loads acting on the wind turbine 100, and the power output of the wind turbine 100 is reduced to zero. As an example, the cut-out speed 208 may be approximately 25 metres per second.

As illustrated, the power curve 200 comprises a characteristic "S" shaped curve between the cut-in speed 202 and the rated speed 204. The region of the power curve 200 in which the power output levels off and increases from below the rated power 206 up to the rated power 206 is known as the knee region 210, also referred to as the knee area or the deflection point. Across the knee region 210, the wind turbine 100 transitions from partial load to full load operation, or vice versa.

One method for temporarily increasing the power generated by the wind turbine 100 above the rated power 206 is known as a power boost. Power boosts are typically initiated when the wind turbine 100 has been operating below the rated power 206 and the wind speed comes back to above the rated speed 204. During a power boost, the power output of the wind turbine 100 may be increased by, for example, adjusting the pitch of the blades 110 in order to increase the rotational speed of the rotor 106.

In order to avoid damaging the rotor 106 or other components of the wind turbine 100 (i.e. to avoid exceeding their thermal limits), conventional power boosts are limited to a predetermined magnitude, typically up to a maximum of 5% of the rated power 206, and a predetermined duration, typically up to a maximum of 5 seconds.

After the power boost, a recovery period may be initiated which allows the components of the wind turbine 100 such as the generator and the converter to cool down to normal operating temperatures.

Figure 3:
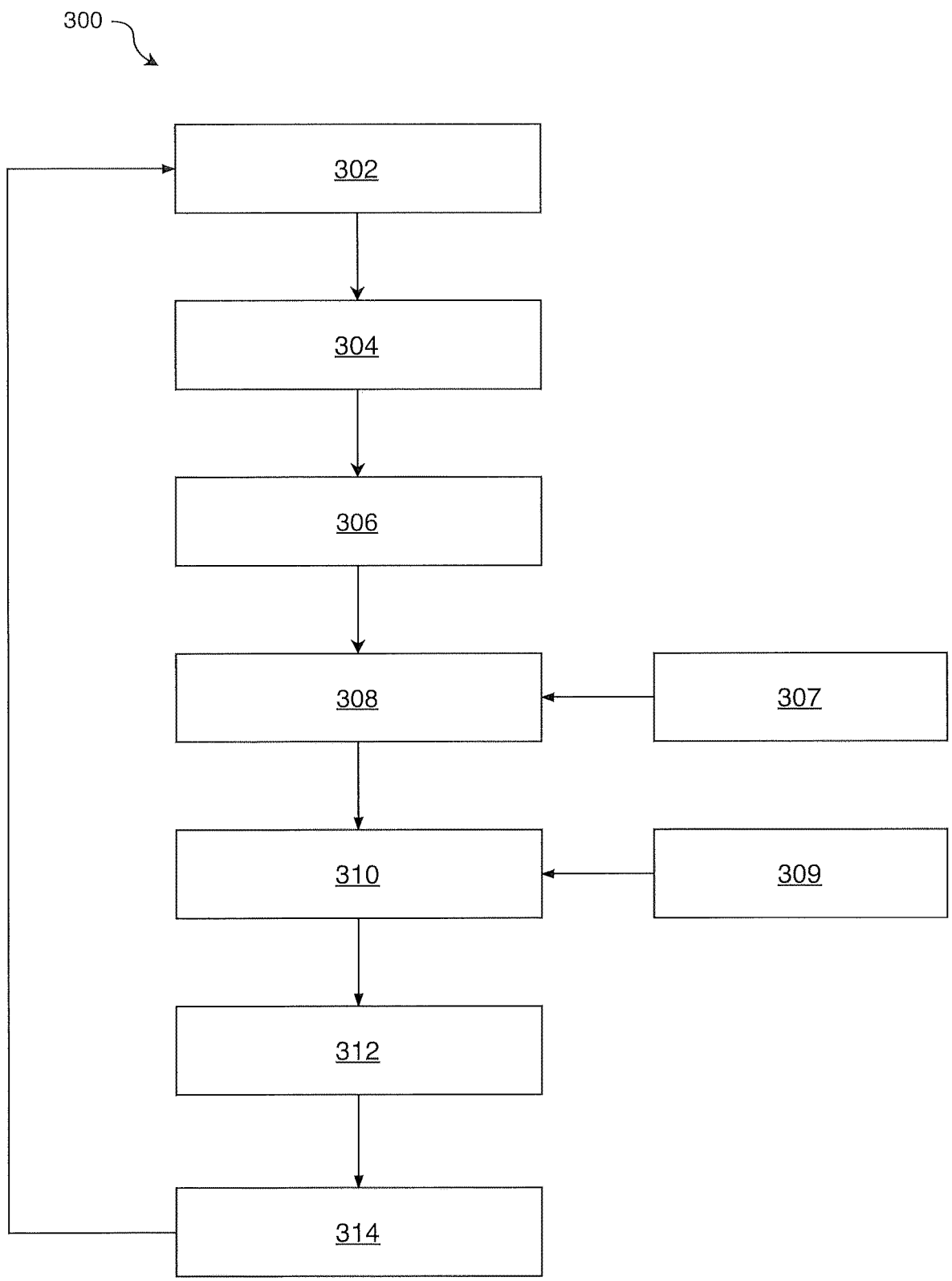
FIG. 3 is a flowchart showing method steps for operating a wind turbine generator.

FIG. 3 illustrates a flowchart which is a method 300 of controlling a wind turbine 100 in accordance with an embodiment of the present invention. In particular, the method 300 allows the magnitude and/or duration of a power boost to be increased beyond the conventional predetermined limits. In this way, the total power exported to grid may be maximised and the annual energy production of the wind turbine 100 increased.

In general, the method 300 will be described herein with reference to the wind turbine 100 and, in particular, may be implemented by the controller 112 of the wind turbine 100. However, it should be appreciated that the method 300 may be implemented using wind turbines, wind turbine generators or wind turbine controllers having any other suitable configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the method 300 may be omitted, rearranged, combined, and/or adapted in various ways without deviating from the scope of the present disclosure.

The method begins at step 302 wherein a wind turbine 100 is operated in accordance with a power curve 200, the power curve 200 having a knee region 210 in which the active power generated by the wind turbine 100 increases from below a rated power 206 up to the rated power 206.

At step 304, the temperature of at least one thermal hotspot of the wind turbine 100 is monitored. A thermal hotspot may be defined as a location within the wind turbine 100 that is particularly susceptible to overheating during operation of the wind turbine 100. Examples of components of the wind turbine 100 which may be considered as thermal hotspots include an insulated-gate bipolar transistor (IGBT) chip, a grid choke, a capacitor; and a busbar. The respective temperatures of the one or more thermal hotspots may be measured continually during operation of the wind turbine 100, at periodic intervals during operation of the wind turbine 100, immediately before initiating the power boost and/or during the power boost. The measurements may be performed using one or more temperature sensors disposed at respective locations of the one or more thermal hotpots. The temperature of the thermal hotspots is influenced by the ambient temperature and the total power generated by the wind turbine 100.

At step 306, a power boost is initiated to temporarily increase the active power generated by the wind turbine 100 above the rated power 206 when the wind turbine 100 enters the knee region 210 of the power curve 200. The power boost may equally be performed when the wind turbine 100 enters the knee region 210 due to an increase in wind speed, or when the wind turbine 100 enters the knee region 210 due to a decrease in wind speed.

Preferably, the temporary increase in active power happens every time the wind turbine 100 enters the knee region 210. However, particular modes where the power boost mode only occurs if other specific conditions are met, e.g. only when the knee region 210 is entered whilst the wind speed is decreasing or only when the knee region 210 is entered whilst the wind speed is increasing, may be of benefit. Some wind turbines 100 may be set to enter the boost mode every time the wind turbine 100 enters the knee region 210, others only whilst the wind speed is increasing and still others only whilst the wind speed is decreasing.

Possible alternative or additional criteria for initiating the power boost may include one or more of a duration since the last power boost, current production of a whole wind turbine park 400, and historic and/or predicted production of the wind turbine park 400.

In some embodiments, the power boost may only be initiated if the temperature of the at least one thermal hotspot is below a threshold temperature. For example, a threshold temperature for the IGBT chip may be 100° C., which is the maximum operating temperature for the IGBT chip with an intended lifetime of 25 years. Therefore, in this case, the power boost may only be initiated if the temperature of the IGBT chip is determined to be less than 100° C.

Optionally, at step 307, the level of oscillations within one or more locations of the wind turbine 100 may monitored. For example, the level of oscillations within the tower 102 and/or the drivetrain (e.g. generator, gearbox) may be monitored. The level of oscillations may be monitored continually during operation of the wind turbine 100, at periodic intervals during operation of the wind turbine 100, immediately before initiating the power boost, and/or during the power boost.

At step 308, one or more damping functions of the wind turbine 100 are temporarily reduced or disabled. This may occur concurrently with the initiation of the power boost when the wind turbine 100 enters the knee region 210 of the power curve 200, or immediately before the initiation of the power boost when the wind turbine 100 enters the knee region 210 of the power curve 200.

The peak electrical power that may be transported through the converter of the wind turbine 100 is determined by the thermal limits of the converter. Above the peak electrical power, the converter is expected to overheat and the wind turbine 100 may be damaged. The total power transported through the converter, i.e. the total power generated by the wind turbine 100, is apportioned into various components. A first proportion of the power transported through the converter is used for transient damping functions e.g. drive train damping and/or active tower damping, such as side-to-side tower damping, a second proportion of the power transported through the converter is lost as heat, and a third proportion, i.e. the remainder of the power, may be exported to the electrical grid. Hence, by temporarily deprioritising or reducing the components that are not exported to the grid, the (active) power that can be or is transported to the grid may be increased without exceeding the peak electrical power that may be transported through the converter of the wind turbine 100.

In particular, by reducing or disabling the one or more damping functions, the amount of active power that was previously used for the one or more damping functions may instead be exported to the grid, thereby allowing for a power boost with an increased magnitude and/or duration without exceeding thermal limits, e.g. the thermal limits of the converter.

Examples of damping functions include active tower damping and drivetrain damping. The damping functions may operate by controlling the generator of the wind turbine 100 such a counter acting torque is provided to a generator shaft. In other words, active power fluctuations can be imposed by the controller 112 to reduce torque fluctuations on the gearbox, known as drivetrain damping, or reduce motions of the tower, known as active tower or side-side tower damping. By reducing or disabling the one or more damping functions, higher loading, such as fatigue loading, of components, e.g. the drivetrain is accepted in exchange for a temporary increase in active power production, i.e. an increased power boost.

In some embodiments, the one or damping functions may be reduced or disabled in accordance with the level of oscillations within one or more locations of the wind turbine 100, as monitored at step 307. For example, when the level of oscillations is low, the damping functions may be significantly reduced or disabled entirely. Conversely, when the level of oscillations is high, the damping functions may only be slightly reduced or not reduced at all. Advantageously, this ensures that the safety of the wind turbine is not compromised when reducing the damping functions.

In some embodiments, the one or more damping functions may be reduced or disabled in accordance with the ambient temperature. For example, if the ambient temperature is lower than a threshold ambient temperature, the one or more damping functions may be disabled, whereas if the ambient temperature is higher than the threshold ambient temperature, the one or more damping functions may be minimised. The skilled person will appreciate that the one or damping functions may similarly be controlled in accordance with the temperature of the one or more thermal hotspots, e.g. the IGBT chip, which is dependent on the ambient temperature.

Optionally, at step 309, an indication of reactive power demand is received. For example, the wind turbine 100 may receive an indication of the minimum amount of reactive power that the wind turbine 100 must output to satisfy the demands of the electrical grid. The indication of reactive power demand may be received at the wind turbine 100 continually during operation of the wind turbine 100, at periodic intervals during operation of the wind turbine 100, immediately before initiating the power boost, and/or during the power boost.

At step 310, the reactive power generated by the wind turbine 100 is reduced. This may occur concurrently with the initiation of the power boost when the wind turbine 100 enters the knee region 210 of the power curve 200, or immediately before the initiation of the power boost when the wind turbine 100 enters the knee region 210 of the power curve 200. The total power generated by the wind turbine 100 and transported through the converter is made up of active power and reactive power, both of which are responsible for driving the thermal limits of the converter.

Hence, by temporarily reducing the reactive power that is generated by the wind turbine 100 and fed through the grid side converter, a larger amount of active power may be generated by the wind turbine and fed through the converter without exceeding the thermal limits of the converter.

In some embodiments, the reactive power generated by the wind turbine 100 may be reduced in accordance with the indication of reactive power demand, received at step 309. For example, the reactive power may be reduced to a minimum amount of reactive power that is able to satisfy the reactive power demands of the electrical grid. Alternatively, the wind turbine 100 may be operated in a power factor control mode, wherein the reactive power production from the wind turbine 100 is controlled to match the active power production at a fixed ratio. For example, since reactive energisation of an offshore array network is low at below nominal power where the total current from turbines is lower than nominal, operating in power factor control mode will result in automatically minimising the demand for reactive power injection by the wind turbine 100 to the grid in the knee region 210 when the wind turbine 100 power has not reached a nominal power, thereby leaving more headroom for the active power boost. This may be appreciated using the relationship between total power (S), active power (P), and reactive power (Q), which may be given by $P=\sqrt{S^2-Q^2}$.

Sudden wind gusts are liable to cause variations in a rotational speed of the rotor 106. Therefore, in some embodiments, the method 200 may further comprise controlling the wind turbine 100 such that a standard deviation of rotational speed variations of the rotor 106 is limited or minimised. This may occur concurrently with the initiation of the power boost when the wind turbine 100 enters the knee region 210 of the power curve 200, or during operation of the wind turbine 100 within the knee region 210. Such control limits the torque and thus limits current overshoots on the machine-side converter, which would otherwise result in the wind turbine 100 stopping due to the converter tripping. Hence, a greater headroom for the active power boost is allowed.

At step 312, at least one of a magnitude and a duration of the power boost, and preferably both the magnitude and the duration of the power boost, is controlled in accordance with the temperature of the one or more hotspots and, optionally, the reduction in the one or more damping functions and/or the reduction in reactive power generated by the wind turbine 100. This may occur concurrently with the initiation of the power boost when the wind turbine 100 enters the knee region 210 of the power curve 200, or immediately before the initiation of the power boost when the wind turbine 100 enters the knee region 210 of the power curve 200. As discussed above, by controlling the power boost in accordance with these factors, the magnitude and/or duration of the power boost may be maximised without exceeding the thermal limits of the wind turbine 100, and in particular the converter. For example, the magnitude and/or the duration of the power boost may be controlled in dependence on a difference between the temperature of the at least one thermal hotspot and a threshold temperature of the at least one thermal hotspot. The at least one thermal hotspot may typically correspond to a component within the wind turbine 100 with the highest thermal inertia. For example, the at least one thermal hotspot may correspond to the location of the IGBT chip, and the threshold temperature for the IGBT chip may be 100° C.

In some embodiments, the magnitude and/or duration of the power boost may be controlled concurrently with the initiation of the power boost when the wind turbine 100 enters the knee region 210 of the power curve 200. In other words, the magnitude and/or duration of the power boost is controlled in accordance with the temperature of the one or more thermal hotspots, and optionally the reduction in the one or more damping functions and/or the reduction in reactive power generated by the wind turbine 100, at the instant the wind turbine 100 enters the knee region 210. In other embodiments, the magnitude and/or duration of the power boost may, additionally or alternatively, be controlled during the power boost. For example, the magnitude and/or duration of the power boost may be adaptively controlled in accordance with the varying temperature of the one or more thermal hotspots during the power boost.

Operating the wind turbine 100 in accordance with method 300 enables the magnitude of the power boost to be increased to at least 10% of the rated power 206, and/or the duration of the power boost to be increased to at least 100 seconds, without exceeding the design limits of the wind turbine 100.

At step 314, the power boost is terminated. This may be caused by the wind turbine 100 exceeding the duration of the power boost controlled at step 312, or may be caused by the wind turbine 100 exiting the knee region 210 of the power curve 200, e.g. the wind speed decreasing below the cut-in speed 202 or the wind increasing above the rated speed 204. The method 300 loops backs to step 302 wherein the wind turbine 100 is operated in accordance with the power curve 200. In other words, once the knee region 210 is passed, the wind turbine 100 returns to normal control, on either sides of the knee region 100, i.e. the wind turbine 100 gradually or at once stops performing the power boost.

Figure 4:
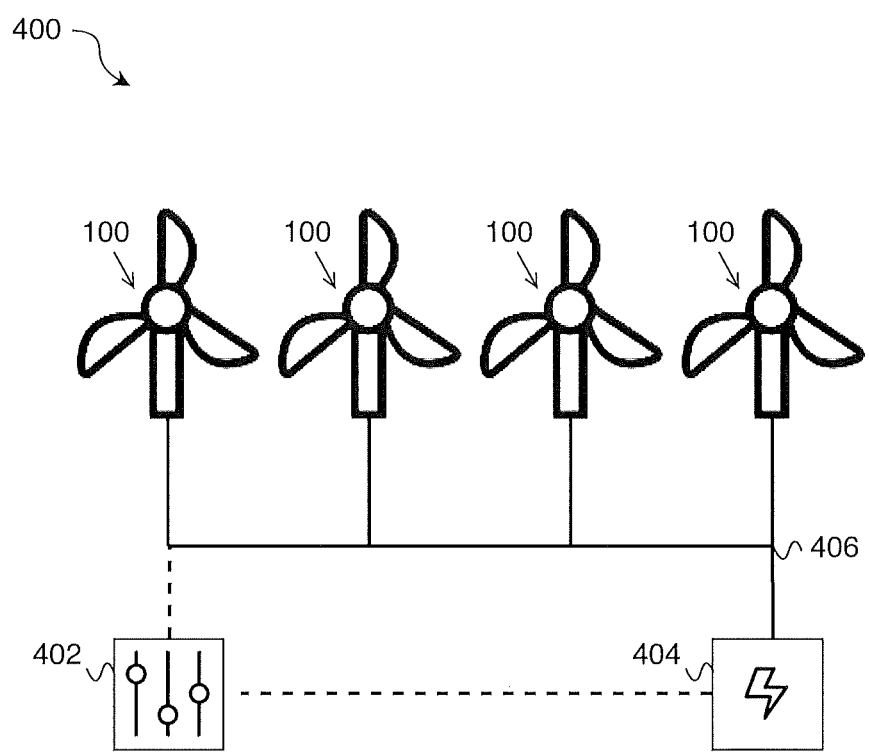
FIG. 4 is a schematic view of wind park comprising a wind park controller and a plurality of wind turbine generators.

FIG. 4 shows a wind park 400 comprising a wind park controller 402 and a plurality of wind turbines 100 (i.e. wind turbine generators). Each wind turbine 100 is configured to be controlled in accordance with method 300. In the illustrated example, the wind park 400 comprises four wind turbines 100, but the skilled person will appreciate that the number of wind turbines 100 may vary.

Each wind turbine 100 is communicatively coupled to a wind park controller 402, either wirelessly or via a wired connection. The wind park controller 402 can communicate bi-directionally with each wind turbine 100, and the wind park controller 402 is configured to control operation of each wind park controller 402, e.g. send one or more commands to each wind turbine 100, the one or more commands being configured to control operation of the wind turbine 100, such as increasing or decreasing the reactive power generated by the wind turbine 100. Each wind turbine 100 is configured to output electrical power to a grid connection point 404 via one or more power lines 406.

The wind park controller 402 is configured to control the power output (e.g. active power and/or reactive power) of the one or more wind turbines 100 of the plurality of wind turbines 100 to ensure, for example, a constant power output of the wind park 400 to the grid connection point 404 and/or that the power output of the wind park 400 meets the power demand of the grid.

In particular, when at least one wind turbine 100 of the plurality of wind turbines 100 is performing a power boost in its knee region 210, the wind park controller 402 may control or adjust the active power and/or reactive power generated by at least one wind turbine 100 of the plurality of wind turbines 100 that is not operating in its knee region 210. For example, the active power and/or reactive power generated by at least one wind turbine 100 that is not operating in its knee region 210 may be controlled in dependence on at least one of an active power demand and a reactive power demand of the grid.

In some embodiments, when at least one wind turbine 100 is performing a power boost and has reduced its reactive power generation (i.e. step 310 of method 300 has been performed), the wind park controller 402 may increase the reactive power generated by at least one other wind turbine 100 that is not operating in the knee region 210. In this way, the reduction in reactive power output of the wind turbine 100 undergoing a power boost is compensated by the at least one other wind turbine 100 that is not undergoing a power boost. In other words, the wind park controller 402 is configured to control a proportion of the reactive (and/or active) power generated by the two or more wind turbines 100 of the plurality of wind turbines 100 in accordance with a difference in timing of the two or more wind turbines 100 entering the knee region 210 of the power curve 200.

For example, one or more wind turbines 100 located in an upwind position of the wind park 400 may enter their respective knee regions 210 earlier than one or more wind turbines 100 located in a downwind position of the wind park 400. Consequently, the one or more wind turbines 100 in the upwind position may initiate a power boost and reduce their reactive power output, whereas the one or one or more wind turbines 100 in the downwind position will continue normal operation. In response, the wind park controller 402 will increase the reactive power output of the one or more wind turbines 100 in the downwind position that have not entered their respective knee regions 210, thereby compensating for the reduction in reactive power of the one or more wind turbines 100 in the upwind position

The invention claimed is:

1. A method of controlling a wind turbine generator comprising:
   operating the wind turbine generator in accordance with a power curve having a knee region;
   monitoring a temperature of at least one thermal hotspot of the wind turbine generator;
   wherein, when the wind turbine generator enters the knee region of the power curve:
      initiating a power boost to temporarily increase an active power generated by the wind turbine generator above a rated power
      reducing one or more damping functions of the wind turbine generator, such that a proportion of the active power generated by the wind turbine generator that is used for the one or more damping functions is reduced and a proportion of active power generated by the wind turbine generator that may be exported by the wind turbine generator is increased; and,
      controlling at least one of a magnitude and a duration of the power boost in dependence on the temperature of the at least one thermal hotspot of the wind turbine generator.

2. The method of claim 1, wherein at least one of the magnitude and the duration of the power boost is controlled in dependence on a difference between the temperature of the at least one thermal hotspot and a threshold temperature of the at least one thermal hotspot.

3. The method of claim 1, further comprising:
   reducing a reactive power generated by the wind turbine generator when the wind turbine generator enters the knee region of the power curve; and
   controlling at least one of the magnitude and the duration of the power boost in dependence on the reduction in the reactive power generated by the wind turbine generator.

4. The method of claim 3, further comprising:
   receiving an indication of reactive power demand; and
   reducing the reactive power generated by the wind turbine generator in dependence on the indication of reactive power demand when the wind turbine generator enters the knee region of the power curve.

5. The method of claim 1, further comprising:
   monitoring a level of oscillations associated with the one or more damping functions; and
   reducing the one or more damping functions in dependence on the level of oscillations.

6. The method of claim 1, wherein the one or more damping functions comprise at least one of:
   drive train damping; and
   active tower damping.

7. The method of claim 1, wherein the one or more thermal hotspots corresponds to one or more components of the wind turbine generator comprising at least one of:
   an insulated-gate bipolar transistor, IGBT, chip;
   a grid choke;
   a capacitor; and
   a busbar.

8. The method of claim 1, further comprising:
   controlling a rotational speed of a rotor of the wind turbine generator such that a standard deviation of variations in the rotational speed of the rotor is limited.

9. A controller for a wind turbine generator, configured to perform the method of claim 1.

10. A wind turbine generator comprising a controller according to claim 9.

11. A wind park comprising a wind park controller and a plurality of wind turbine generators according to claim 10, wherein the wind park controller is configured to:
   in response to at least one wind turbine generator of the plurality of wind turbine generators performing a power boost in its knee region, control at least one of the active power and the reactive power generated by at least one wind turbine generator of the plurality of wind turbine generators that is not operating in its knee region.

12. The wind park of claim 11, wherein the wind park controller is configured to control at least one of the active power and the reactive power generated by the at least one wind turbine generator of the plurality of wind turbine generators that is not operating in its knee region in accordance with at least one of an active power demand and a reactive power demand.

13. The wind park of claim 11, wherein said control of at least one of the active power and the reactive power comprises:
   increasing the reactive power generated by the at least one wind turbine generator of the plurality of wind turbine generators that is not operating in its knee region.

* * * * *